(12) United States Patent
Dennis et al.

(10) Patent No.: US 6,803,005 B2
(45) Date of Patent: Oct. 12, 2004

(54) METHOD FOR MAKING MULTI-LAYER, PERSONNEL-PROTECTIVE HELMET SHELL

(75) Inventors: Mike Dennis, Scappoose, OR (US); Russell A. Monk, Salem, OR (US)

(73) Assignee: MJD Innovations, LLC, Scappoose, OR (US)

( * ) Notice: Subject to any disclaimer, the term of this patent is extended or adjusted under 35 U.S.C. 154(b) by 77 days.

(21) Appl. No.: 10/003,742

(22) Filed: Nov. 14, 2001

(65) Prior Publication Data
US 2004/0040071 A1 Mar. 4, 2004

(51) Int. Cl.$^7$ .................. B29C 41/08; B29C 41/22
(52) U.S. Cl. .................. 264/219; 264/255; 264/257; 264/267; 264/309; 264/321
(58) Field of Search .................. 2/410, 414, 411, 2/412; 264/219, 220, 226, 227, 257, 258, 255, 259, 267, 309, 321

(56) References Cited

U.S. PATENT DOCUMENTS

| | | | | |
|---|---|---|---|---|
| 2,140,716 A | * | 12/1938 | Pryale | 2/414 |
| 2,378,642 A | * | 6/1945 | Kopplin | 264/137 |
| 3,018,210 A | * | 1/1962 | Frieder et al. | 2/2.5 |
| 3,444,288 A | * | 5/1969 | Mead | 264/161 |
| 3,501,772 A | * | 3/1970 | Wyckoff | 2/421 |
| 3,770,483 A | | 11/1973 | Komine | |
| 3,935,044 A | * | 1/1976 | Daly | 156/79 |
| 3,946,441 A | | 3/1976 | Johnson | |
| 4,008,949 A | * | 2/1977 | Luna | 359/518 |
| 4,020,507 A | * | 5/1977 | Morton | 2/411 |
| 4,102,964 A | * | 7/1978 | Ridgeway | 264/511 |
| 4,136,226 A | | 1/1979 | Gilman | |
| 4,279,038 A | | 7/1981 | Bruckner et al. | |
| 4,288,268 A | * | 9/1981 | Hartung | 156/245 |
| RE32,569 E | * | 1/1988 | Aileo et al. | 2/416 |
| 4,822,549 A | * | 4/1989 | Verwilst et al. | 264/250 |
| 4,845,786 A | * | 7/1989 | Chiarella | 2/412 |
| 4,874,640 A | | 10/1989 | Donzis | |
| 4,993,076 A | | 2/1991 | Dierickx | |
| 5,177,815 A | | 1/1993 | Andujar | |
| 5,233,743 A | * | 8/1993 | Robertson et al. | 29/527.1 |
| 5,424,021 A | * | 6/1995 | Nakade et al. | 264/257 |
| 5,713,082 A | * | 2/1998 | Bassette et al. | 2/412 |
| 5,790,988 A | | 8/1998 | Guadagnino, Jr. et al. | |
| 6,108,825 A | * | 8/2000 | Bell et al. | 2/455 |
| 6,374,422 B1 | * | 4/2002 | Gonzalez et al. | 2/425 |
| 6,425,141 B1 | * | 7/2002 | Ewing et al. | 2/412 |
| 6,446,270 B1 | * | 9/2002 | Durr | 2/412 |
| 6,467,099 B2 | * | 10/2002 | Dennis et al. | 2/455 |
| 6,536,052 B2 | * | 3/2003 | Tao et al. | 2/411 |

FOREIGN PATENT DOCUMENTS

JP         07-096046       *    4/1995

* cited by examiner

Primary Examiner—Stefan Staicovici
(74) Attorney, Agent, or Firm—Jon M. Dickinson, PC; Robert D. Varitz, PC

(57) ABSTRACT

A method for making a multi-layer helmet shell wherein inner and outer, structural, load-bearing semi-rigid layers are spray-deposited onto opposite surfaces of a pre-shaped, pliable viscoelastic, acceleration-rate-sensitive, microcellular foam core.

2 Claims, 1 Drawing Sheet

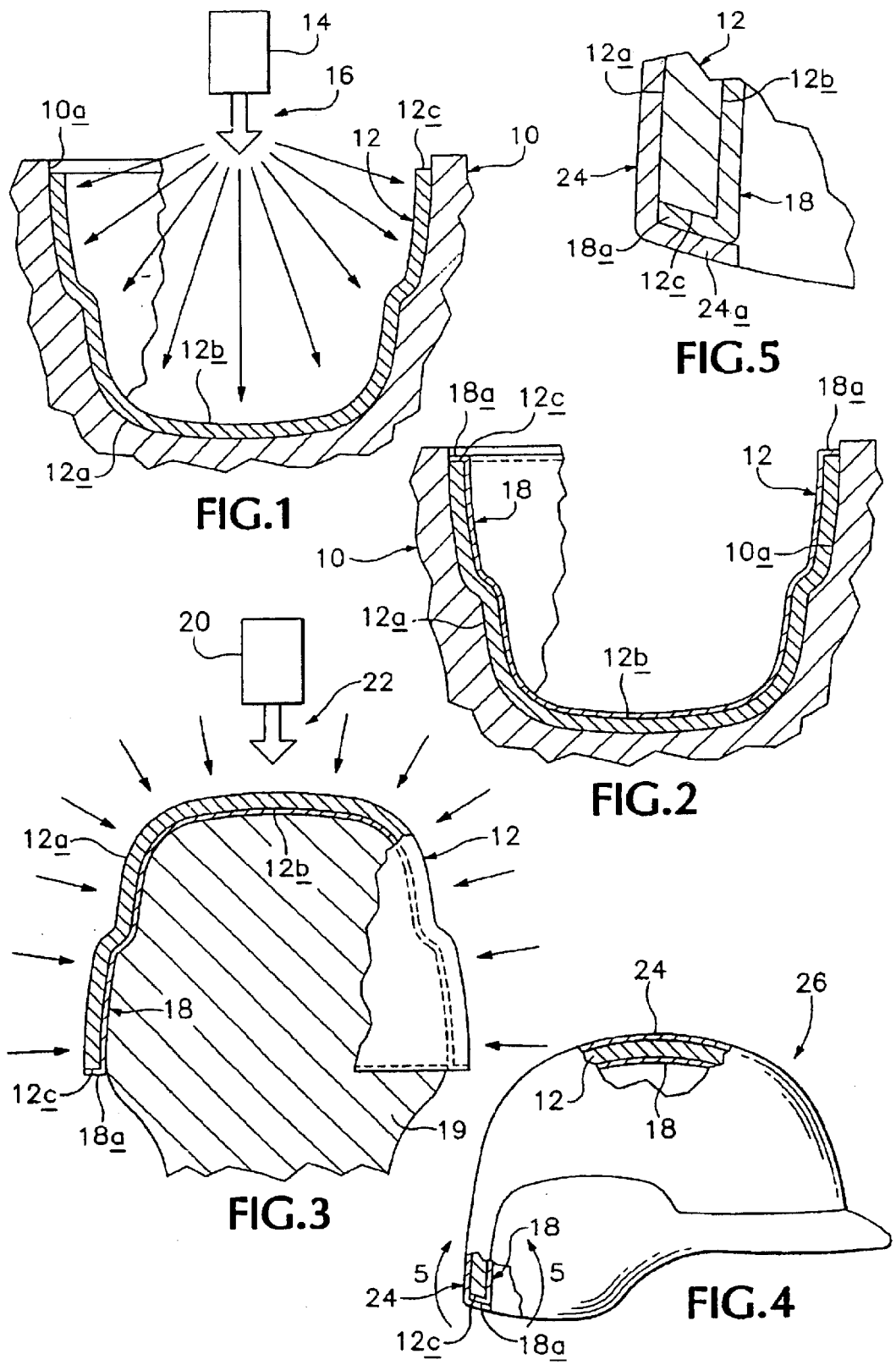

METHOD FOR MAKING MULTI-LAYER, PERSONNEL-PROTECTIVE HELMET SHELL

BACKGROUND OF THE INVENTION

The invention pertains to personnel-protective (blunt object impact and noise suppression) helmet shell construction, and in particular, to such a shell, and to a method of making the same, where inner and outer, load-bearing, semi-rigid structural layers in the shell are formed/fabricated by the process of vapor-suspension, material-spray deposition. Preferably employed for such a structural spray is a two-component, polyurea/polyurethane spray elastomer system, such as the component system known as HYDROTHANE made and sold by Hydroseal Polymers, Inc. of Riverside, Calif. The two components making up this product are isocyanate and polyol. We have discovered that this commercially available system, which is focusedly designed to create protective coatings over other objects, can itself be employed to form independent structural object per se. This discovery opens the door to the moldless creation of many different kinds of structural objects, such as the helmet shell structure which is particularly disclosed and illustrated herein.

This spray material, appropriately prepared for spraying as a particle vapor-suspension, includes particles having a strong bonding affinity for one another upon contact. Contacting particles conglomerate after landing with one another to form, progressively, a solid, semi-rigid, load-bearing structure. The "exposed" surface of this forming structure has an infinitely and subtlety selectable and controllable topography, dictated principally by how much material is sprayed, and how the forming spray is aimed and maneuvered, during the spraying procedure.

Proposed by the invention is a novel multilayer (especially three-layer), personnel-protective helmet shell construction wherein a central (or core) layer is formed of a suitable shock-absorbing (and also sound-deadening) soft, viscoelastic, microcellular foam layer, jacketed on its inner and outer surfaces by sprayed-formed, more rigid (semi-rigid) layers of a vapor-suspension, structural deposition plastic material. As will become apparent, the invention features a simple, quick, precise, inexpensive and reliably repeatable manufacturing practice which offers a number of significant functional advantages, and attractive fabrication economies, in relation to conventional, molded, helmet-shell practices. The resulting helmet shell offers robust, high-level load-distribution and blunt-object-impact cushioning performance, as well as noise suppression.

The various features, objectives and appealing advantages that are offered and attained by the present invention will become more fully apparent as the description which now follows is read in conjunction with the accompanying drawings.

DESCRIPTION OF THE DRAWINGS

FIG. 1 is a simplified view illustrating one manner of practicing initial stages in the formation of a multilayer helmet shell in accordance with the present invention—such initial formation as illustrated taking place within an appropriately shaped, open, female cavity provided in a suitable external structure.

FIG. 2 is similar to FIG. 1, except that here one sees what constitutes herein as a second-stage, precursor, helmet-shell result which exists after performance of the practice shown in FIG. 1.

FIG. 3 illustrates a next step in the preparation of the helmet shell of the present invention, and specifically a step which is implemented after the second-stage precursor shell pictured in FIG. 2 has been removed from the female cavity, and placed on an appropriately shaped supporting male mandrel.

FIG. 4 is a side view, partly sectioned to show details of construction, of the desired, finished helmet shell.

FIG. 5 is an enlarged, fragmentary detail of the area in FIG. 4 which is generally embraced by curved arrows 5—5.

DETAILED DESCRIPTION OF, AND BEST MODE FOR CARRYING OUT, THE INVENTION

Fundamentally, practice of the present invention to create the desired, multilayer helmet shell involves the spray formation, on the inner and outer surfaces of a shaped foam core layer, of inner and outer semi-rigid structural shell layers. As distinguished from conventional helmet-making practices (typically involving costly molding), no molding step is employed. The cavity and mandrel referred to above in the descriptions of the drawings are furnished as external structures that provide support and configuration shaping at different points in the preferred manner of practicing the invention.

Turning now to the drawings, in an appropriately formed, open-topped, female well, or cavity, 10a in a structure 10, a central core layer 12 of suitable soft, pliable and compressible, viscoelastic, microcellular foam material is placed to conform generally complementarily to the shape of this well. Provision of structure 10 with its cavity 10a is referred to herein as preparing (at least partially) an environment fro the reception of a spray material. An appropriate material for core layer 12 is the viscoelastic, acceleration-rate-sensitive, noise-suppressing urethane material called PORON®, made by Rogers Corporation of Woodstock, Conn., and sold as one of the urethane products in the PORON® 4000 Performance Urethane 90 Series line of products offered by that company. The material preferably chosen from this line exhibits a rebound characteristic lying in the range of about 5%–10% rebound, as determined in a standard ASTMD 2632-90 Vertical Rebound Resiliency Test, and most preferably possesses about 8% rebound. Also, the selected viscoelastic material exhibits an energy dissipation characteristic lying preferably in the range of about 0.5–0.9, according to a standard TAN Ä Energy Dissipation Ratio Test, and most preferably about 0.7.

Preferably, this core material is initially prepared by precision die-cutting of a starter shape, or blank, from a sheet of the mentioned material. Such preparation is referred to herein as shaping. While natural shape-memory in the core material sheet will cause the die-cut blank thereof to tend to fit with its outside surface 12a snugly against the inside surface of well 10a, it is preferable to assure an initially stable, conforming fit by employing a suitable coating of any conventional light-duty, easy-release contact adhesive on the well's surface. Anther appropriate manner of establishing a conforming fit is through the use of a suitable vacuum-creating system which draws the blank against the well wall. Core material 12 herein, also referred to as a first precursor helmet shell, has a preferred thickness of about ¼-inches.

With the core-layer material thus inserted in well 10a, and with shape-memory in the material, and any suitably employed temporary adhesive (or a vacuum system), causing the outside surface of the core-layer blank to lie in close conformance, flush against the inside surface of well 10a, the stage is set for the next step in the fabrication process.

With core-material blank 12 so placed in the well, from any suitable pressurized source, such as source 14, of a spray of preselected, quick setting and curing (8–10-seconds), structural, semi-rigid plastic deposition material, such as the two-component material generally mentioned earlier, a vapor-suspension spray 16 of this material is directed under suitable control such as under manual or computer control, into the interior of the core-material blank. A spray-material product selected from the named HYDROTHANE system line of materials, exhibits, after formation and curing, a semi-rigidity which is characterized by a Shore hardness lying in the range of about 60 Shore A–70 Shore D, and most preferably about 90 Shore A. Spraying is carried out preferably with structure 10 and material 12 residing at normal ambient temperature and at atmospheric pressure. The mentioned spray material has an affinity to conglomerate and bond to itself, with freshly accumulating material curing to rigidity in the very short time frame mentioned above.

In the particular process now being described, source 14 includes two pressurized and pre-heated containers, one for each of the two components in the HYDROTHANE material. An appropriate container pressure for each component is about 1400-psi, and an appropriate temperature, about 120°–140° F. for the isocyanate container, and about 140°–150° F. for the polyol container. From these two containers, the two components flow in a roughly 50/50 proportion toward a mixing spray head (not shown) through independent hoses (also not shown) each heated to about 110°–120° F.

By controlling the amount of material employed during spraying, and by maneuvering the aim and location of the spray, such spraying essentially by itself determines the final topography of layer 18, given, of course, the fact that the inner surface of core layer 12 plays an initial role in defining shape and topography.

Such spraying creates a selected-thickness (herein about 1/16 to about 1/8-inches) coating, or layer, (see layer 18 in FIGS. 2–5, inclusive) of this spray material on the inner surface 12b in the blank. While a differentiated, distributed thickness can, if desired, easily be achieved in layer 18, for simplicity purposes herein this layer is only shown with a uniform thickness.

As was just mentioned above, the preferred sprayed-on material used for the creation of inner layer 18 effectively dries and cures to a state of stable semi-rigidity within a matter of roughly about 8- to about 10-seconds. A certain amount of this material works its way into the internal pore structure of core layer 12, just beneath surface 12b in that core material. This suffusing of spray material into the core material unites the "surface" interface between layers 12, 18 so that the united surface regions act effectively in mechanically locked unison in the finished helmet shell. Curing and rigidifying of layer 18 essentially locks the assembly of layer 12, and the newly-formed, sprayed-on layer 18, into configuration stability. As can be seen in FIGS. 2–5, inclusive, a small edge portion 18a in sprayed layer 18 extends over and covers the exposed, thin, ridge-like edge 12c of core layer 12.

The combination of core layer 12 and sprayed inner layer 18 constitutes a second precursor helmet shell herein.

Next, the assembly made up of core layer 12 and inner layer 18 is removed from cavity 10a, and is fitted over an appropriately shaped male mandrel, such as mandrel 19 shown fragmentarily in FIG. 3. Provision of mandrel 19 is referred to herein also as a step in preparing an environment for the reception of spray material. Under these circumstances, the outside surface 12a in core material 12 is now fully exposed.

What happens next is that, from another appropriate pressurized supply, or source, 20 of another selected, structural, spray deposition material, a new vapor-suspension spray 22 is directed appropriately onto the outer surface in the core layer to form a sprayed-on outer layer 24 (see FIGS. 4 and 5). In the making of the particular helmet shell now being described, the material deposited to form outer layer 24 is the same as that which has been used to form inner layer 18, and as was true with respect to the cooperative interface that develops between layers 12, 18, a like unified interface develops bewteen layers 18, 24. Spraying is performed in the manner just above described for the creation of layer 18. Layer 24 herein has a uniform thickness of about 1/16- to about 1/8-inches. Layer 24 includes an edge portion 24a which bonds unitarily to edge portion 18a in layer 18.

Application of this second spray of deposition material thus creates a second jacketing, sprayed-on, structural, semi-rigid layer which now cooperates with core layer 12 and inner layer 18 to form the final desired helmet shell. The finished shell is pictured freestanding at 26 in FIGS. 4 and 5.

It is important to note that, except for the shaped pre-presence of core layer 12, inner and outer layers 18, 24 are entirely shaped by controlled material deposition. No shape-dedicated, expensive, precision mold surfaces are required. The process of the invention thus enables the making of a substantially infinite variety of structural shapes, free from the economic challenge of building and maintaining expensive molds. While the fabrication procedure specifically described herein begins with the use of a female external structure and ends with the use of a male external structure, a reverse approach can also be employed.

While the invention has been disclosed in a particular setting, and in particular forms herein, the specific embodiments disclosed, illustrated and described herein are not to be considered in a limiting sense. Numerous variations, some of which have been discussed, are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as useful, novel and non-obvious. Other such combinations and subcombinations of features, functions, elements and/or properties may be claimed through amendment of the present claims or through presentation of new claims in this or in a related application. Such amended and/or new claims, whether they are broader, narrower or equal in scope to the originally presented claims, are also regarded as included within the subject matter of applicants' invention.

What is claimed is:

1. A dual spray-deposition method of making a multilayer helmet shell employing, in appropriate succession as support structures, a female cavity, and an associated male mandrel comprising:

utilizing an appropriate, generally sheet-like body of a first selected material, shaping and configurationally supporting a generally helmet-shaped central structural core layer having inner and outer surfaces, and forming a first precursor helmet shell;

while so supporting the core layer selectively on one of the mentioned support structures, assuring the substantially full-access exposure of at least one of such surfaces;

directing toward such at least one surface a spray of a first, selected, vapor-suspension deposition material to form on, and joined to, the at least one surface a structural layer which, along with the core layer, form a second precursor helmet shell;

thereafter, supporting the second precursor helmet shell on the other mentioned support structure so as to assure the substantially full-access exposure of the other one of such surfaces; and then directing toward such other surface a spray of a second, selected, vapor-suspension deposition material to form on, and suitably joined to, the other surface a third structural layer, thus completing the fabrication of the intended, finished helmet shell.

2. A method of making a multilayer helmet shell comprising:

in a generally helmet-shaped female cavity, forming a pliable layer of a selected material to form a central core having a helmet shape and an exposed inner surface;

directing a spray of a first, selected, vapor-suspension deposition material onto the exposed inner surface of the core in the cavity to form a structural inner layer which bonds to the inner surface, and which generally stabilizes, into a helmet shape, the combined core and inner layer;

removing the joined central core material and inner layer from the cavity, and placing this assembly onto a generally helmet-shaped male mandrel, with the core having an exposed outer surface;

directing a spray of a second, selected, vapor-suspension deposition material onto the exposed outer surface of the core to form a structural outer layer which bonds to the outer surface, and which collectively, with the inner layer, forms a substantially fully encapsulating jacket around the core; and removing from the mandrel, as a finished helmet shell, the assembly of the inner layer, the core, and the outer layer.

* * * * *